US009288709B2

(12) United States Patent
Ding et al.

(10) Patent No.: US 9,288,709 B2
(45) Date of Patent: Mar. 15, 2016

(54) ADJUSTABLE CARRIER SENSE THRESHOLD FOR WIRELESS BROADCAST

(71) Applicant: QUALCOMM Incorporated, San Diego, CA (US)

(72) Inventors: Gang Ding, San Diego, CA (US); Kiran S. Chikkappa, Bangalore (IN); Patrik N. Lundqvist, Encinitas, CA (US); Rahul Malik, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 13/763,680

(22) Filed: Feb. 10, 2013

(65) Prior Publication Data

US 2014/0226497 A1     Aug. 14, 2014

(51) Int. Cl.
*H04L 12/413* (2006.01)
*H04W 28/02* (2009.01)
*H04W 74/08* (2009.01)

(52) U.S. Cl.
CPC ...... *H04W 28/0231* (2013.01); *H04W 74/0808* (2013.01)

(58) Field of Classification Search
None
See application file for complete search history.

(56) References Cited

U.S. PATENT DOCUMENTS

| 6,922,405 | B2 | 7/2005 | Eikelenboom et al. |
| 8,085,683 | B2 | 12/2011 | Leith et al. |
| 2006/0009161 | A1 | 1/2006 | Beecher |
| 2007/0060155 | A1 | 3/2007 | Kahana et al. |
| 2007/0214247 | A1 | 9/2007 | Yang et al. |
| 2010/0302961 | A1 | 12/2010 | Timmers |
| 2011/0128846 | A1* | 6/2011 | Hong et al. .......... 370/230 |
| 2012/0002567 | A1 | 1/2012 | Sun et al. |
| 2012/0099450 | A1* | 4/2012 | Madan et al. ........ 370/252 |
| 2013/0223250 | A1* | 8/2013 | Matsuo et al. ....... 370/252 |

OTHER PUBLICATIONS

Karn, "MACA—A New Channel Access Method for Packet Radio", Amateur Radio 9th Computer Networking Conference, pp. 134-140, London, UK, Sep. 1990.
Tobagi, F. et al.: "Packet Switching in Radio Channels: Part II—The Hidden Terminal Problem in Carrier Sense Multiple-Access and the Busy-Tone Solution," IEEE Transactions on Communications, vol. COM-23, No. 12, pp. 1417-1433 (1975-12).
International Search Report and Written Opinion—PCT/US2014/014459—ISA/EPO—May 9, 2014.

* cited by examiner

*Primary Examiner* — Bob Phunkulh
(74) *Attorney, Agent, or Firm* — Arent Fox LLP

(57) ABSTRACT

A method of adjusting a carrier sense threshold to avoid hidden nodes during wireless broadcast. The method includes monitoring a load of the peer-to-peer network before broadcasting a message from a node. The method also includes adjusting a carrier sense threshold (CST) based on the load of the peer-to-peer network to avoid broadcast message collisions due to one or more hidden nodes.

12 Claims, 7 Drawing Sheets

ADJUSTABLE CARRIER SENSE THRESHOLD FOR WIRELESS BROADCAST

BACKGROUND

1. Field

Aspects of the present disclosure relate generally to wireless communication systems, and more particularly to adjusting a carrier sense threshold to avoid hidden nodes during wireless broadcast.

2. Background

Wireless networks are widely deployed to provide various communication services such as voice, video, packet data, messaging, broadcast and other wireless communication services. These wireless networks may be multiple-access networks capable of supporting multiple users by sharing the available network resources. In a wireless local area network (WLAN), an access point supports communication for a number of wireless stations within the wireless network. In an ad-hoc mode, the wireless stations communicate in a peer-to-peer (P2P) manner without an access point. Similarly, a peer-to-peer network allows the nodes to directly communicate with one another. In a peer-to-peer network, peer-to-peer nodes within range of one another discover and communicate directly without an access point.

During fast message dissemination in a large P2P wireless network, devices wake up periodically (e.g., once every minute) to broadcast a message until the information is exchanged among the devices. Any device that receives a message more recent than its current message, updates the current message and starts broadcasting the updated message based on the recent message. Each device may sense a shared channel before broadcasting the updated message. When a channel noise level sensed from the shared channel is above a carrier sense threshold (CST), the device knows the channel is busy and backs-off. Although devices are capable of sensing when the channel noise level is above the CST, many broadcast failures and collisions occur due to a hidden node problem.

A conventional solution to the hidden node problem includes a request to send (RTS) and clear to send (CTS) handshake for reserving the channel before transmitting actual data over the channel. Other solutions exist for different scenarios and system requirements, such as multiple channels, multiple radios, transmission power control, etc. These solutions, however, do not apply to broadcast messaging without RTS and CTS. Further, existing solutions address the hidden node problem for the purpose of increasing a continuous data throughput of each device.

SUMMARY

According to one aspect of the present disclosure, a method for adjusting a carrier sense threshold to avoid hidden nodes during wireless broadcast is described. The method includes monitoring a load of the peer-to-peer network before broadcasting a message from a node. The method may also include adjusting a carrier sense threshold (CST) based on the load of the peer-to-peer network to avoid broadcast message collisions due to one or more hidden nodes.

According to another aspect of the present disclosure, an apparatus for adjusting a carrier sense threshold to avoid hidden nodes during wireless broadcast is described. The apparatus includes a means for monitoring a load of the peer-to-peer network before broadcasting a message from a node. The apparatus may also include a means for adjusting the CST based on the load of the peer-to-peer network to avoid broadcast message collisions due to one or more hidden nodes.

According to one aspect of the present disclosure, a computer program product for adjusting a carrier sense threshold to avoid hidden nodes during wireless broadcast is described. The computer program product includes a computer readable medium having non-transitory program code recorded thereon. The program code includes program code to monitor a load of the peer-to-peer network before broadcasting a message from a node. The program code also includes program code to adjust the CST based on the load of the peer-to-peer network to avoid broadcast message collisions due to one or more hidden nodes.

According to one aspect of the present disclosure, an apparatus for adjusting a carrier sense threshold to avoid hidden nodes during wireless broadcast is described. The apparatus includes a memory and a processor(s) coupled to the memory. The processor(s) is configured to monitor a load of the peer-to-peer network before broadcasting a message from a node. The processor(s) is further configured to adjust the CST based on the load of the peer-to-peer network to avoid broadcast message collisions due to one or more hidden nodes.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art however, that these concepts may be practiced without these specific details. In some instances, well-known structures and components are shown in block diagram form to avoid obscuring such concepts. As described herein, the use of the term "and/or" is intended to represent an "inclusive OR", and the use of the term "or" is intended to represent an "exclusive OR".

Some aspects of the disclosure describe a method for adjusting a carrier sense threshold (CST) to avoid hidden nodes during wireless broadcast in a wireless network. Although aspects of the disclosure relate to ad-hoc and/or peer-to-peer network implementations in which wireless nodes and/or wireless stations discover and communicate directly without access points, the wireless nodes may be specified as access points and stations. Alternatively, access points can operate as peers.

As noted, current solutions address the hidden node problem for the purpose of increasing a continuous data throughput of each wireless node. Aspects of the present disclosure, however, address the hidden node problem while sending a single broadcast message from each wireless node and expecting the broadcast message to quickly propagate throughout the entire P2P network. In one aspect of the present disclosure, a load of the P2P network is monitored before sending the broadcast message from a wireless node. The CST for broadcasting a message is adjusted based on the P2P network load to avoid broadcast message collisions due to one or more hidden nodes. For example, the CST may be lowered as a way to improve the capability of the wireless nodes to sense a shared channel before broadcasting a message. Lowering the CST may result in a larger carrier sense range. The larger carrier sense range improves the ability of the wireless nodes to sense when a hidden node is broadcasting in the shared channel and to back-off to avoid collision with the hidden node. The method for adjusting the carrier sense threshold to avoid hidden nodes during wireless broadcast may be implemented in various wireless networks such as the configuration shown in FIG. 1.

Figure 1:
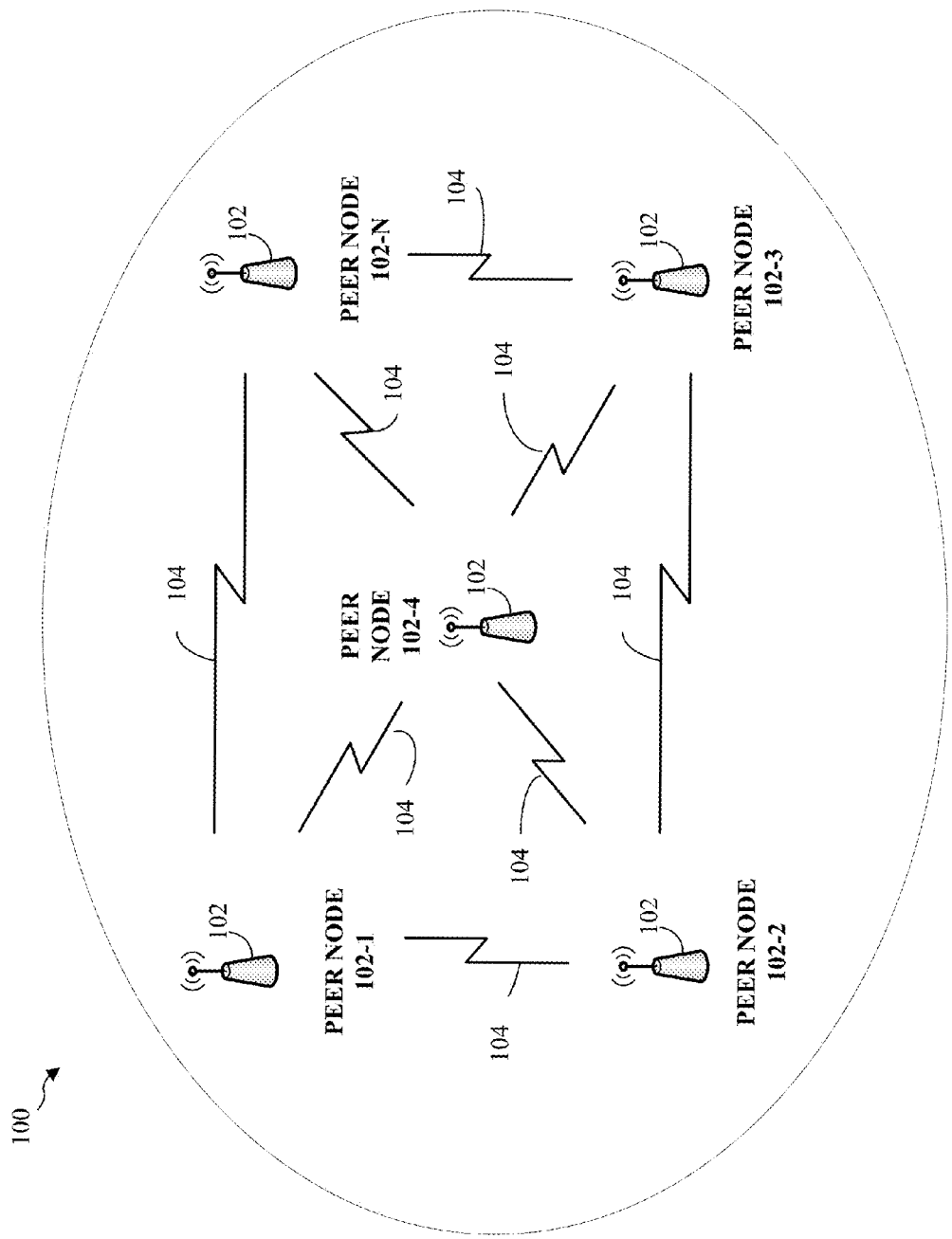
FIG. 1 illustrates a block diagram of a peer-to-peer network according to one aspect of the disclosure.

FIG. 1 illustrates a block diagram of a peer-to-peer network 100 according to one aspect of the disclosure. In some aspects, the peer-to-peer network 100 may be established between two or more wireless nodes (i.e., peer-to-peer network nodes) 102 (102-1, 102-2, 102-3, 102-4, . . . 102-n). The wireless nodes 102 in the peer-to-peer network 100 may communicate wirelessly using any suitable wireless network standard. The peer-to-peer network 100 may include a number of wireless nodes 102 that can communicate with one another over wireless links 104.

The wireless nodes 102 may be any device configured to send and receive wireless communications, such as a laptop computer, smartphone, a printer, a personal digital assistant, a camera, a cordless telephone, a session initiation protocol phone, a handheld device having wireless connection capability, a user equipment, an access terminal, a base station, a base transceiver station, or any other suitable device. The wireless nodes 102 in the peer-to-peer network 100 may communicate wirelessly using any suitable wireless network standard. Although the peer-to-peer network 100 is illustrated the number of the wireless nodes 102 is five, it should be appreciated that any number of nodes may form the peer-to-peer network 100. In the peer-to-peer network 100, the wireless nodes 102 may be distributed throughout a geographic region. Each of the wireless nodes 102 may have a different coverage region over which it may communicate.

One of the wireless nodes 102 (e.g., wireless node 102-1) may associate with any other of wireless nodes 102 (e.g., wireless node 102-4) to send and/or receive communications. In one aspect of the disclosure, service related information for services or applications is included in a wireless message broadcast by one of the wireless nodes 102. To receive the wireless messages, the wireless nodes 102 may perform a broad coverage search over a coverage region.

Figure 2:
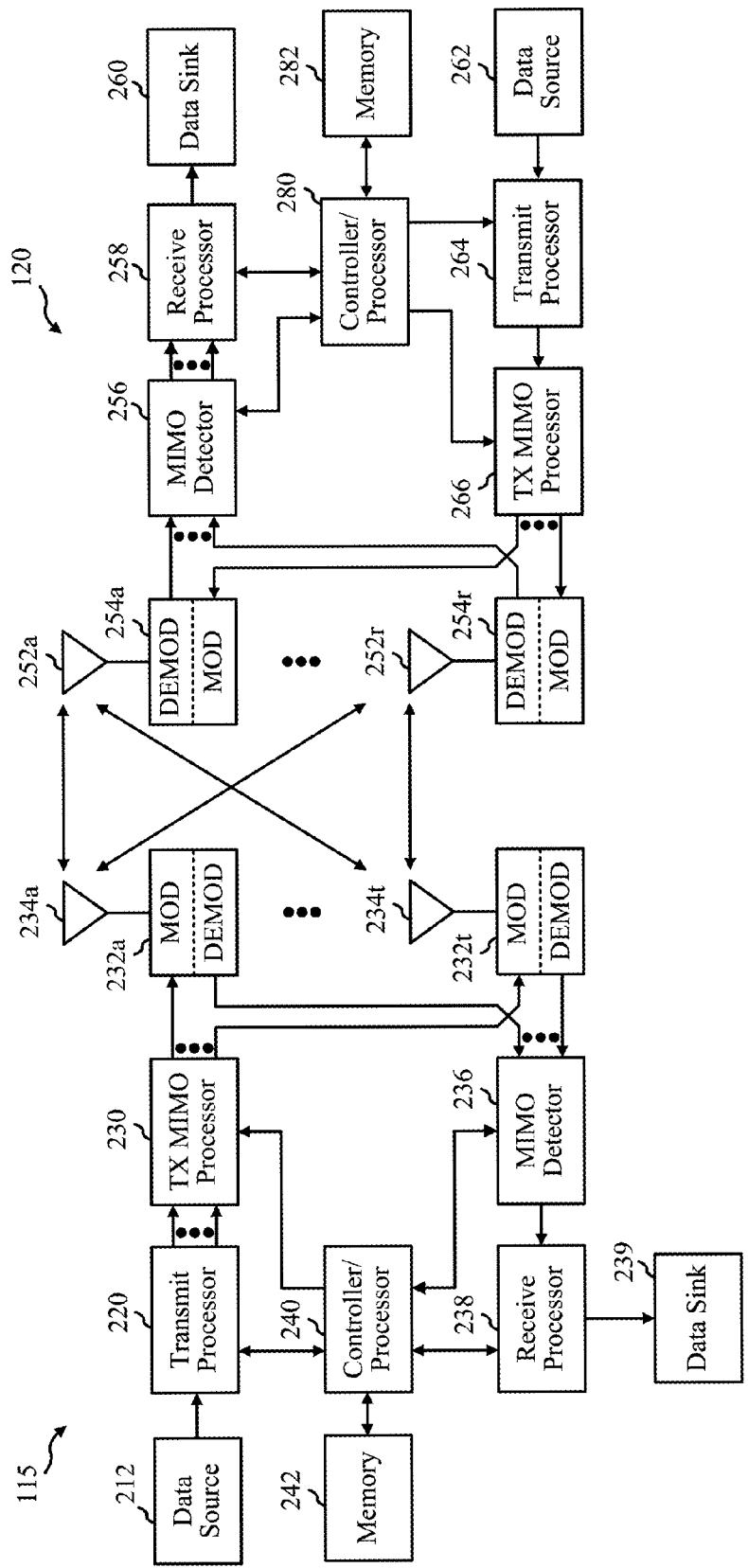
FIG. 2 illustrates exemplary wireless nodes for use in the peer-to-peer network illustrated in FIG. 1.

FIG. 2 illustrates exemplary wireless nodes for use in the peer-to-peer network illustrated in FIG. 1. The wireless nodes in the peer-to-peer network 100 may include a first wireless station 115 in communication with a second wireless station 120. Each of the wireless nodes in the peer-to-peer network 100 may include a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel.

In one configuration, the first wireless station 115 may be equipped with antennas 234a through 234t, and the second wireless station 120 may be equipped with antennas 252a through 252r.

At the first wireless station 115, a transmit processor 220 may receive data from a data source 212 and control information from a controller/processor 240. The transmit processor 220 may process (e.g., encode and symbol map) the data and control information to obtain data symbols and control symbols, respectively. The transmit processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator/demodulator 232 may process a respective output symbol stream to obtain an output sample stream. Each modulator/demodulator 232 may further process (e.g., convert to analog, amplify, filter, and upconvert) the output sample stream to obtain a transmission signal. Signals from modulators 232a through 232t may be transmitted via the antennas 234a through 234t, respectively.

At the second wireless station 120, the antennas 252a through 252r may receive the signals from the first wireless station 115 and may provide received signals to the demodulators (DEMODs) 254a through 254r, respectively. Each modulator/demodulator 254a may condition (e.g., filter, amplify, downconvert, and digitize) a respective received signal to obtain input samples. Each modulator/demodulator 254a may further process the input samples to obtain received symbols. A MIMO detector 256 may obtain received symbols from all the modulator/demodulator 254 (254a, . . . , 254r) perform MIMO detection on the received symbols if applicable, and provide detected symbols. A receive processor 258 may process (e.g., demodulate, deinterleave, and decode) the detected symbols, provide decoded data for the second wireless station 120 to a data sink 260, and provide decoded control information to a controller/processor 280.

When transmitting, from the second wireless station 120, a transmit processor 264 may receive and process data from a data source 262 and control information from the controller/processor 280. The transmit processor 264 may also generate reference symbols for a reference signal. The symbols from the transmit processor 264 may be precoded by a TX MIMO processor 266 if applicable, further processed by the modulator/demodulator 254 (254a, . . . , 254r) and transmitted to the first wireless station 115. At the first wireless station 115, the signals received from the second wireless station 120 may be received by the antennas 234, processed by the modulator/demodulator 232, detected by a MIMO detector 236 if applicable, and further processed by a receive processor 238 to obtain decoded data and control information sent by the second wireless station 120. The receive processor 238 may provide the decoded data to a data sink 239 and the decoded control information to the controller/processor 240.

The controller/processor 240 and the controller/processor 280 may direct the first wireless station 115 and the second wireless station 120, respectively. The controller/processor 240, 280 and/or other processors and modules at the first wireless station 115/second wireless station 120 may perform or direct the execution of the functional blocks illustrated in method flow chart of FIG. 6, and/or other processes for the techniques described herein. The memory 242 and the memory 282 may store data and program codes for the first wireless station 115 and the second wireless station 120, respectively.

Figure 3:
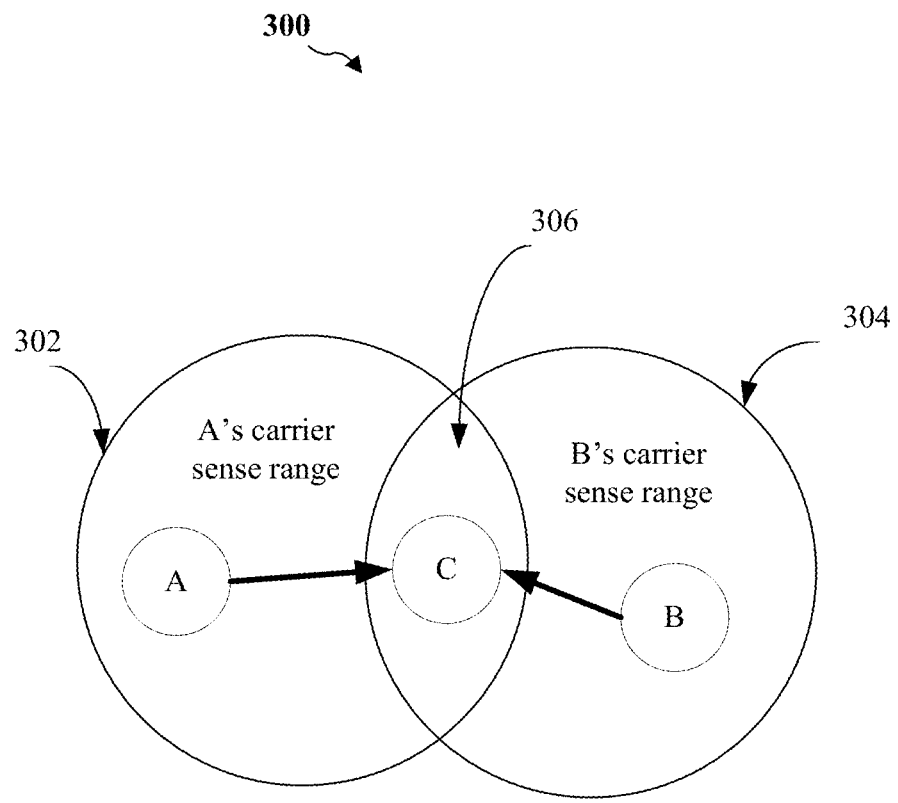
FIG. 3 is a diagram illustrating the hidden node problem.

FIG. 3 is a diagram 300 illustrating the hidden node problem with respect to peer-to-peer (P2P) network nodes A, B and C (e.g., wireless nodes 102 of FIG. 1). The nodes A, B and C of FIG. 3 are arranged as follows: node C operates within a carrier sense range 302 and a carrier sense range 304 associated with nodes A and B, respectively; and node B operates outside the carrier sense range 302 associated with node A. In this configuration, node C operates in carrier sense region 306 corresponding to an overlap of the carrier sense range 302 and the carrier sense range 304 associated with nodes A and B, respectively. The carrier sense range of a node (e.g., node A) may be defined as the area encompassing those nodes whose transmission A is perceived (i.e., carrier sensed) while not necessarily being able to process the transmission. In this configuration, node B may not detect ongoing broadcasting from node A to node C by carrier sensing. Consequently, node B can interfere with node C's reception of node A's broadcast message. Because node A and node B cannot sense each other, the broadcast message from node A may collide with the broadcast message from node B because node C is a hidden node. This collision may occur even when nodes A and B avoid broadcasting at exactly the same time.

The hidden node problem for broadcast may be addressed by an implementation based on scalability and speed of disseminating information independent of acknowledge/negative acknowledge signal. In one aspect of the present disclosure, a carrier sense threshold (CST) adjustment for broadcasting a message is implemented to improve sensing of a broadcast message by a node. For example, the CST may be lowered as a way to improve the capability of devices, such as peer-to-peer (P2P) network nodes A and/or B to sense the shared channel before broadcasting a message. The CST is lowered by adjusting the CST according to an upper layer enabled on a node (e.g., A or B). Lowering the CST may result in a larger carrier sense range, thereby improving the ability of node A and/or node B to sense when a node is broadcasting in the shared channel and to back-off to avoid collision at a hidden node C.

Figure 4:
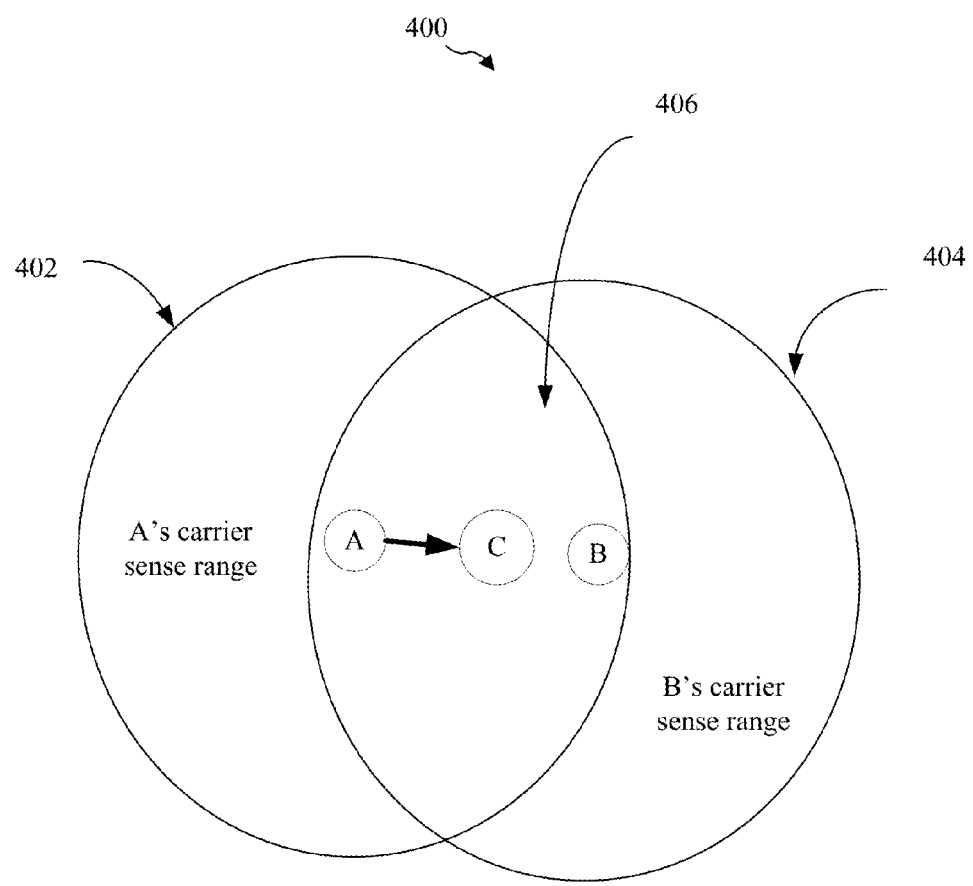
FIG. 4 is a diagram illustrating larger carrier sense ranges resulting from lowered carrier sense thresholds.

FIG. 4 is a diagram 400 illustrating larger carrier sense ranges of nodes A and B resulting from lowering the CST for a broadcast message. In FIG. 4, lowering the CST results in larger carrier sense range 402 and larger carrier sense range 404 associated with nodes A and B, respectively. Nodes A, B and C can be arranged such that nodes A, B and C are operating within the larger carrier sense range 402 and the larger carrier sense range 404 of nodes A and B, respectively. Nodes A, B and C may also operate in the carrier sense region 406 corresponding to an overlap of the larger carrier sense range 402 and the larger carrier sense range 404 associated with nodes A and B, respectively. As a result, node B may detect ongoing broadcasting from node A to node C. Because node A and node B can sense broadcast messages to node C, nodes A and/or B may backoff to avoid collision of broadcast messages. Consequently, node B may not interfere with node C's reception of node A's broadcast message. In one aspect of the disclosure, backing off is based solely on the carrier sense threshold.

A carrier sense threshold (CST) based on dynamic network conditions may be implemented to improve solutions to the hidden node problem while increasing the number of nodes broadcasting at substantially the same time. The implementation is scalable and can support an increased number of nodes because it is based on broadcasting one message (e.g., a small size message) at a time for each node rather than increasing a continuous data throughput of each node. As a result, the increased number of nodes (e.g., 100s to 1000s of nodes) can be supported at one time. In this implementation, each node (A or B) stays awake for a period of time (e.g., a predetermined period of time) to monitor the shared channel and sense the network conditions after the node has broadcasted a message. The sensed network conditions may be based on an amount of successfully received messages from a neighbor node, a determination of a percentage of time the channel is busy (e.g., indicated by the number of times the noise level is above the CST), or other determinations for reducing broadcast collisions. In one aspect of the present disclosure, an appropriate CST is selected based on the network conditions.

Figure 5:
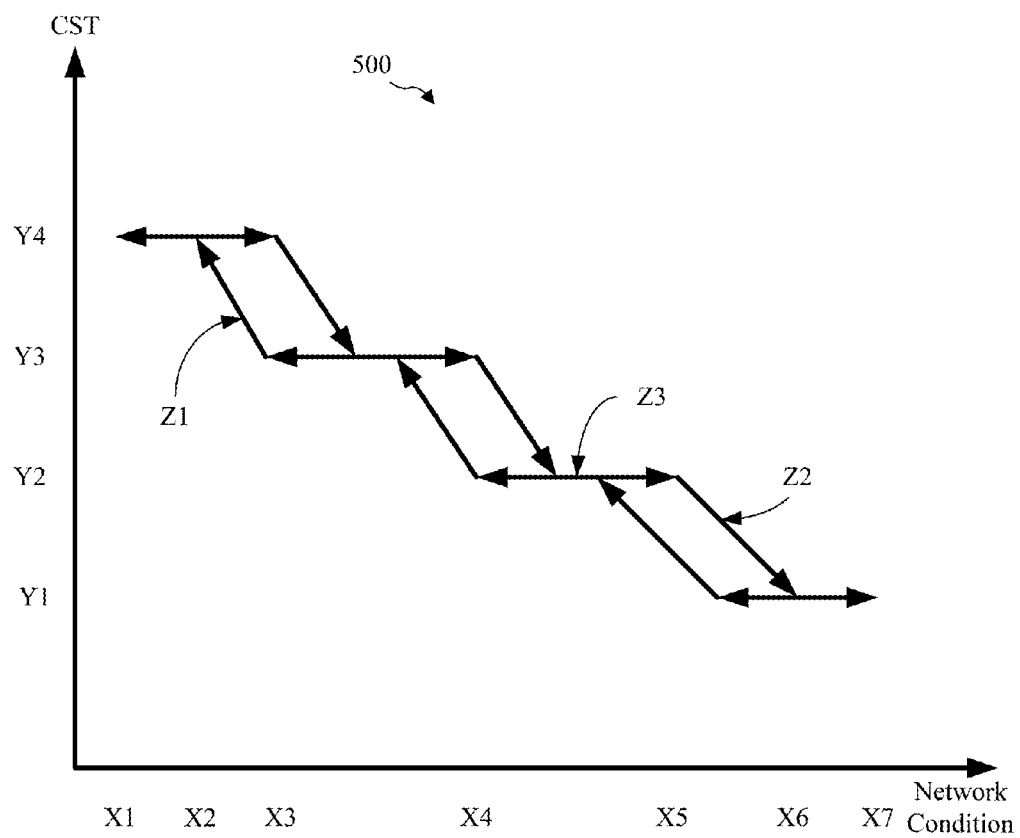
FIG. 5 is an exemplary graph illustrating an adjustable carrier sense threshold (CST) scheme based on sensed network conditions.

FIG. 5 is an exemplary graph 500 illustrating an adjustable CST scheme based on the sensed network conditions. As noted, the network conditions may reflect whether the network is crowded (based on an amount of neighbor messages) or whether the channel is busy. The y-axis of the graph represents the CST. The x-axis of the graph represents the network condition (e.g., network crowd that increases from left to right). A network crowd indicator X1 on the x-axis represents when the network is least crowded. This least crowded indicator X1 corresponds to an increased CST value Y4. As the network crowd indicator increases to X7, for example, the CST is reduced to a value Y1. Representative arrows (e.g., Z1, Z2 and Z3) illustrate adjustments in the CST for a broadcast message as the network conditions change. For example, arrow Z1 represents an increase in CST from Y3 to Y4 corresponding to a decrease in the crowd indicator from X3 to X2. Arrow Z2 represents a decrease in CST from Y2 to Y1 corresponding to a crowd indicator increase from X5 to X6. The CST is maintained at a value Y2 (e.g., as illustrated by arrow Z3) when the network conditions (crowd indicators) are within a small range between X4 and X5.

Figure 6:
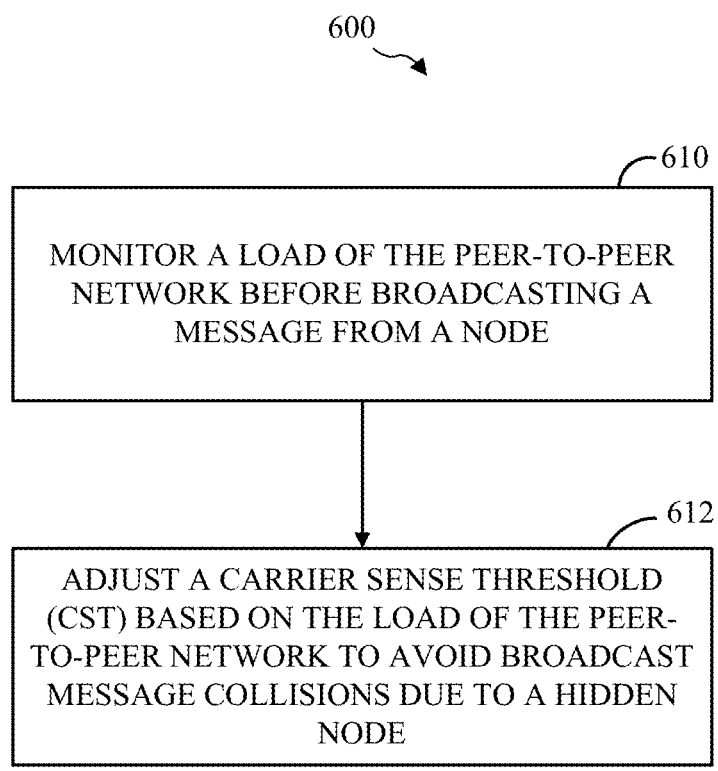
FIG. 6 is a block diagram illustrating a service discovery method implemented in the peer-to-peer network illustrated in FIG. 1.

FIG. 6 is a block diagram 600 illustrating a carrier sense threshold adjustment method to avoid hidden nodes during wireless broadcast in a network. The method can be implemented in the peer-to-peer network 100 illustrated in FIG. 1. At block 610, the method includes monitoring a load of the peer-to-peer network before broadcasting a message from a node. For example, the load of the peer-to-peer network may be determined by determining an amount of broadcast activity from neighbor nodes, counting successfully received messages from the neighbor nodes, counting a percentage of time a channel is busy, or the like. The channel may be busy when a noise level on the channel exceeds a current carrier sense threshold (CST). At block 612, the method includes adjusting the CST based on the peer-to-peer network load to avoid broadcast message collisions due to a hidden node. In the illustration of FIG. 1, the node may be one of the wireless nodes 102.

Figure 7:
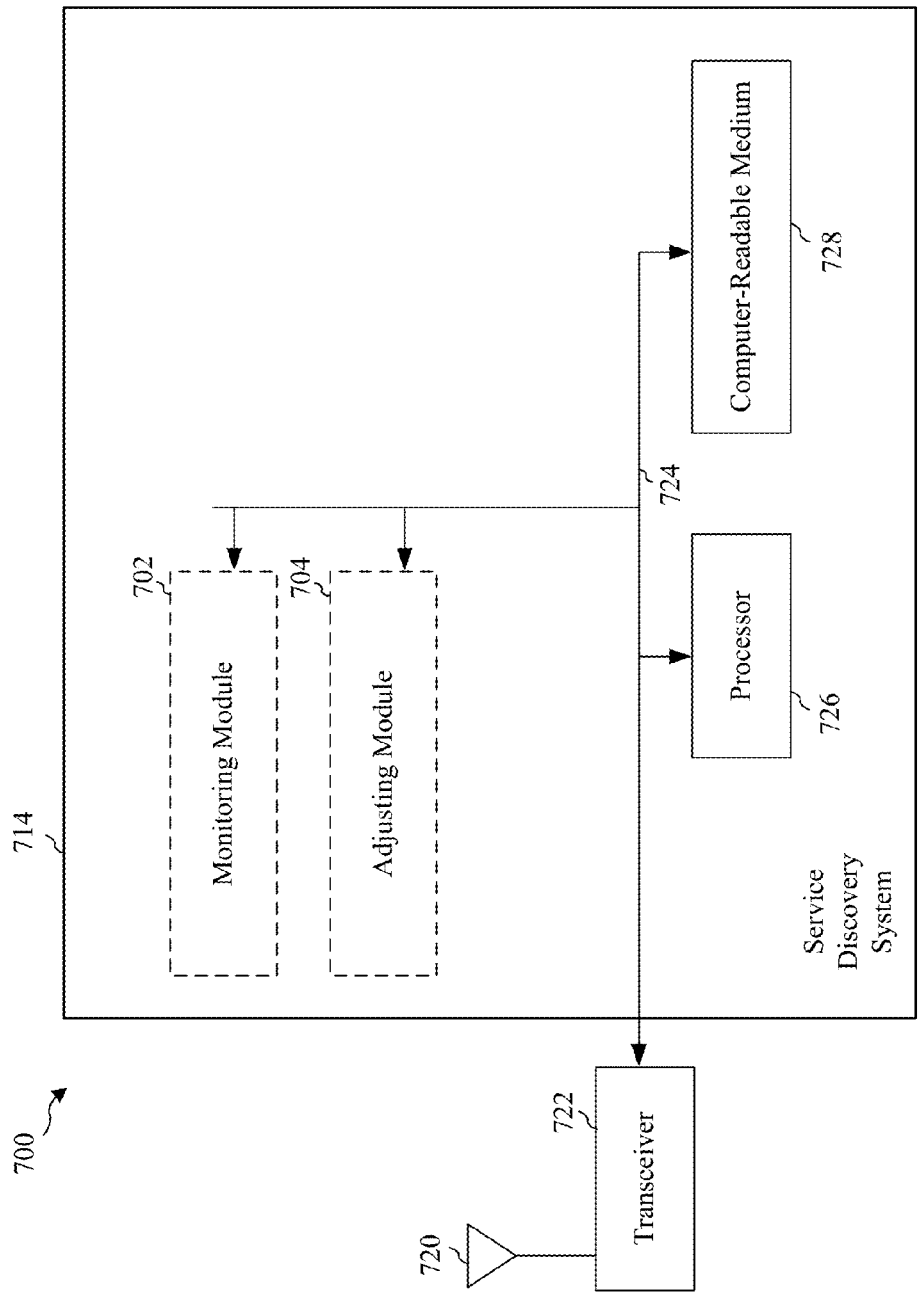
FIG. 7 is a diagram illustrating an example of a hardware implementation for an apparatus employing a service discovery system.

FIG. 7 is a diagram illustrating an example of a hardware implementation for an apparatus 700 (such as one of the wireless nodes 102, the first wireless station 115 and the second wireless station 120) employing a carrier sense threshold adjustment system 714. The carrier sense threshold adjustment system 714 may be implemented with a bus architecture, represented generally by a bus 724. The bus 724 may include any number of interconnecting buses and bridges depending on the specific application of the carrier sense threshold adjustment system 714 and the overall design constraints. The bus 724 links together various circuits including one or more processors and/or hardware modules, represented by a processor 726, a monitoring module 702, an adjusting module 704 and a computer-readable medium 728. The bus 724 may also link various other circuits such as timing sources, peripherals, voltage regulators, and power management circuits, which are well known in the art, and therefore, will not be described any further.

The apparatus includes the carrier sense threshold adjustment system 714 coupled to a transceiver 722. The transceiver 722 is coupled to one or more antennas 720. The transceiver 722 provides a way for communicating with various other apparatus over a transmission medium. The carrier sense threshold adjustment system 714 includes the processor 726 coupled to the computer-readable medium 728. The processor 726 is responsible for general processing, including the execution of software stored on the computer-readable medium 728. The software, when executed by the processor 726, causes the carrier sense threshold adjustment system 714 to perform the various functions described supra for any particular apparatus. The computer-readable medium 728 may also be used for storing data that is manipulated by the processor 726 when executing software.

The carrier sense threshold adjustment system 714 further includes the monitoring module 702 monitoring a load of the peer-to-peer network before broadcasting a message from a node. The carrier sense threshold adjustment system 714 further includes the adjusting module 704 for adjusting a carrier sense threshold (CST) based on the peer-to-peer network load to avoid broadcast message collisions due to a hidden node. The monitoring module 702 and the adjusting module 704 may be software modules running in the processor 726, resident/stored in the computer-readable medium 728, one or more hardware modules coupled to the processor 726, or some combination thereof. The carrier sense threshold adjustment system 714 may be a component of the second wireless station 120, a component of the wireless nodes 102 and/or a component of the first wireless station 115 and may include the memory 242, 282 and/or the controller/processor 240, 280.

In one configuration, the apparatus 700 for wireless communication includes means for monitoring a load of the peer-to-peer network and means for adjusting a carrier sense threshold (CST) based on the peer-to-peer network load. The means may be the monitoring module 702, adjusting module 704, the second wireless station 120, the first wireless station 115, the memory 242, 282, the controller/processor 240, 280, and/or the carrier sense threshold adjustment system 714 of the apparatus 700 configured to perform the functions recited by the embedding means and the broadcasting means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a peer-to-peer network, comprising:
   monitoring a load of the peer-to-peer network before broadcasting a message from a node; and
   adjusting a carrier sense threshold (CST) based on the load of the peer-to-peer network before broadcasting the message, to avoid broadcast message collisions due to one or more hidden nodes, wherein the adjusting comprises—
   lowering the CST to increase a carrier sense range if the load of the peer-to-peer network increases, and
   increasing the CST to decrease the carrier sense range if the load of the peer-to-peer network decreases.

2. The method of claim 1, in which the load of the peer-to-peer network comprises an amount of broadcast activity from neighbor nodes.

3. The method of claim 2, in which monitoring the load of the peer-to-peer network comprises counting successfully received messages from the neighbor nodes.

4. The method of claim 2, in which monitoring the load of the peer-to-peer network comprises counting a percentage of time a channel is busy.

5. The method of claim 4, in which the channel is determined to be busy when a noise level on the channel exceeds a current CST.

6. An apparatus for wireless communication in a peer-to-peer network, comprising:
   means for monitoring a load of the peer-to-peer network before broadcasting a message from a node; and
   means for adjusting a carrier sense threshold (CST) based on the load of the peer-to-peer network before broadcasting the message, to avoid broadcast message collisions due to one or more hidden nodes,
   wherein the means for adjusting comprises:
   means for lowering the CST to increase a carrier sense range when the load of the peer-to-peer network increases, and
   means for increasing the CST to decrease the carrier sense range when the load of the peer-to-peer network decreases.

7. An apparatus for wireless communication in a peer-to-peer network, comprising:
   a memory; and
   at least one processor coupled to the memory and configured to:
   monitor a load of the peer-to-peer network before broadcasting a message from a node; and
   adjust a carrier sense threshold (CST) based on the load of the peer-to-peer network before broadcasting the message, to avoid broadcast message collisions due to one or more hidden nodes,
   wherein the at least one processor is configured to adjust the CST by being configured to:
   lower the CST to increase a carrier sense range when the load of the peer-to-peer network increases, and
   increase the CST to decrease the carrier sense range when the load of the peer-to-peer network decreases.

8. The apparatus of claim 7, in which the load of the peer-to-peer network comprises an amount of broadcast activity from neighbor nodes.

9. The apparatus of claim 8, in which the at least one processor is further configured to monitor the load of the peer-to-peer network by counting successfully received messages from the neighbor nodes.

10. The apparatus of claim 8, in which the at least one processor is further configured to monitor the load of the peer-to-peer network by counting a percentage of time a channel is busy.

11. The apparatus of claim 10, in which the at least one processor is further configured to determine that the channel is busy when a noise level on the channel exceeds a current CST.

12. A non-transitory computer-readable medium storing computer executable code for wireless communication, comprising code for:
   monitoring a load of a peer-to-peer network before broadcasting a message from a node; and
   adjusting a carrier sense threshold (CST) based on the load of the peer-to-peer network before broadcasting the message, to avoid broadcast message collisions due to one or more hidden nodes,
   wherein the code for adjusting the CST comprises code for:
   lowering the CST to increase a carrier sense range when the load of the peer-to-peer network increases, and
   increasing the CST to decrease the carrier sense range when the load of the peer-to-peer network decreases.

* * * * *